(12) United States Patent
Mihira

(10) Patent No.: US 12,513,253 B2
(45) Date of Patent: Dec. 30, 2025

(54) CONTROL METHOD, STORAGE MEDIUM, AND INFORMATION PROCESSING APPARATUS TRANSMITTING A SCAN JOB TO A COMMUNICATION APPARATUS MORE APPROPRIATELY

(71) Applicant: CANON KABUSHIKI KAISHA, Tokyo (JP)

(72) Inventor: Yoshiro Mihira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 18/521,636

(22) Filed: Nov. 28, 2023

(65) Prior Publication Data
US 2024/0179258 A1 May 30, 2024

(30) Foreign Application Priority Data

Nov. 29, 2022 (JP) ................... 2022-189867

(51) Int. Cl.
*H04N 1/00* (2006.01)
*H04N 1/32* (2006.01)
(52) U.S. Cl.
CPC ..... *H04N 1/00938* (2013.01); *H04N 1/32096* (2013.01)
(58) Field of Classification Search
None
See application file for complete search history.

(56) References Cited

U.S. PATENT DOCUMENTS

| 2016/0179559 A1* | 6/2016 | Senda | G06F 9/45545 |
| | | | 718/1 |
| 2017/0064094 A1* | 3/2017 | Kato | H04N 1/00005 |
| 2017/0097836 A1* | 4/2017 | Senda | G06F 9/455 |
| 2019/0116175 A1* | 4/2019 | Sasamoto | G06F 21/33 |
| 2024/0179508 A1* | 5/2024 | Iura | G06F 3/1292 |
| 2024/0179615 A1* | 5/2024 | Iura | G06F 9/541 |

FOREIGN PATENT DOCUMENTS

JP  2017219961 A  12/2017

* cited by examiner

*Primary Examiner* — Miya J Cato
(74) *Attorney, Agent, or Firm* — Canon U.S.A., Inc. IP Division

(57) ABSTRACT

A control method including performing control, based on a predetermined program being running in a second operation environment, in a second information processing apparatus so that a predetermined process is not performed and performing second execution to perform, based on the predetermined program being running in the second operation environment, in the second information processing apparatus, a process relating to another program that is different from the predetermined program and controls a standard scan function pre-installed in a host OS is provided to solve an issue.

19 Claims, 8 Drawing Sheets

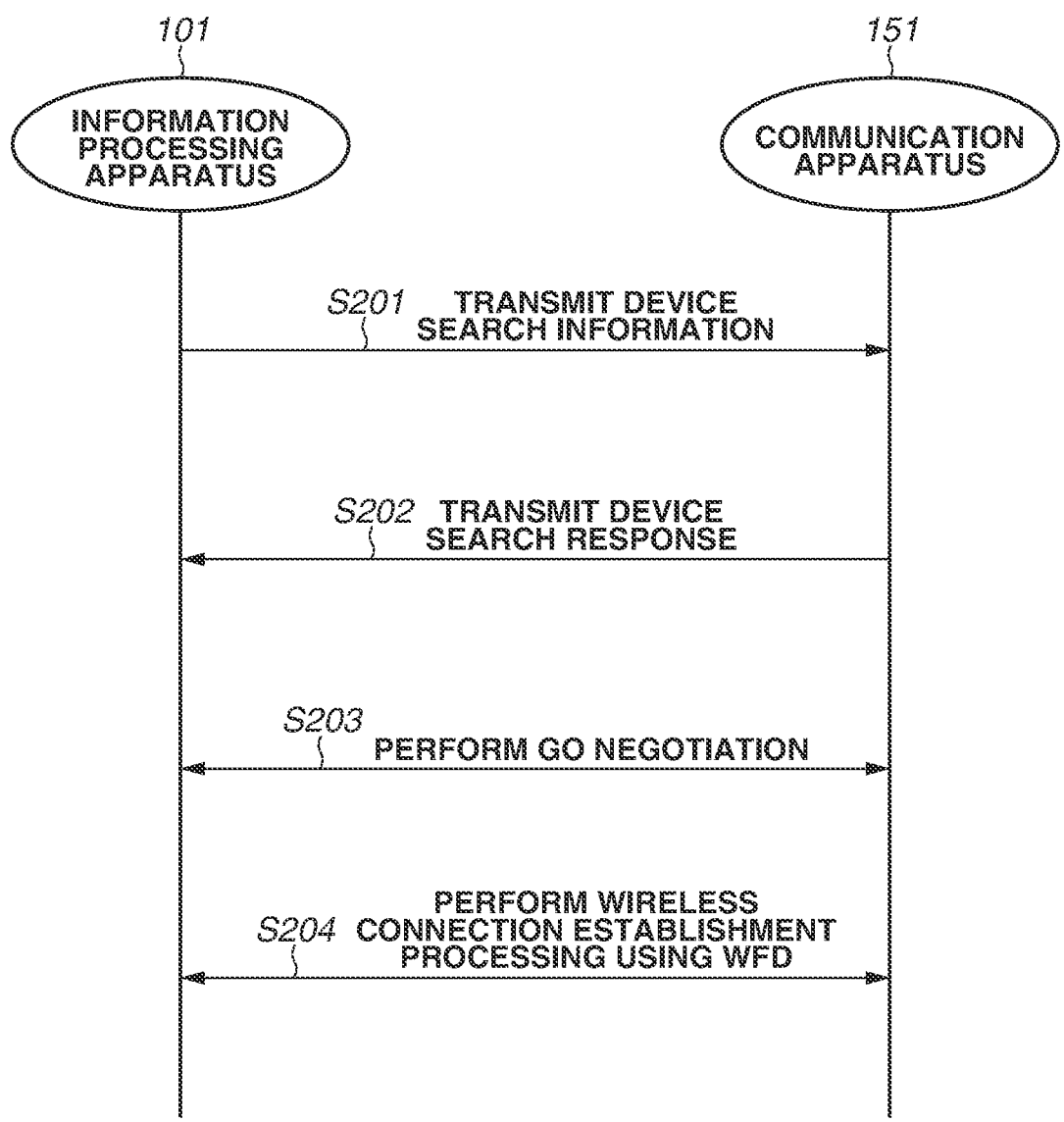

FIG.5

```xml
<?xml version="1.0" encoding="utf-8"?>
<result>
  <status>ok</status>
  <device_type>printer</device_type>
  <model_name>Communication apparatus 151</model_name>
  <ip_address>192.168.0.2</ip_address>
  <mac_address>aa:bb:cc:dd:ee:ff</mac_address>
</result>
```

CONTROL METHOD, STORAGE MEDIUM, AND INFORMATION PROCESSING APPARATUS TRANSMITTING A SCAN JOB TO A COMMUNICATION APPARATUS MORE APPROPRIATELY

BACKGROUND

Field of the Disclosure

The present disclosure relates to a control method, a storage medium, and an information processing apparatus.

Description of the Related Art

Japanese Patent Application Laid-Open No. 2017-219961 discusses an application capable of transmitting a scan job to a communication apparatus.

Meanwhile, as forms in which a scan job can be transmitted to a communication apparatus have become prevalent, there is a demand for performing a process of transmitting a scan job to a communication apparatus more appropriately.

SUMMARY

Embodiments of the present disclosure are directed to performing a process of transmitting a scan job to a communication apparatus more appropriately.

According to embodiments of the present disclosure, a control method of controlling a first information processing apparatus including a predetermined program configured to run on an operating system (OS) and having a first operation environment being on a first OS running as a host OS but not being on a guest OS and a second information processing apparatus having a second operation environment being on a second OS running as the host OS and being on the guest OS, the control method including performing, based on the predetermined program being running in the first operation environment, first execution so that a predetermined process of transmitting a scan job generated by the predetermined program to a communication apparatus is performed in the first information processing apparatus, performing control, based on the predetermined program being running in the second operation environment, so that the predetermined process is not performed in the second information processing apparatus, and performing, based on the predetermined program being running in the second operation environment, second execution so that a process relating to another program that is different from the predetermined program and controls a standard scan function pre-installed in the host OS is performed in the second information processing apparatus.

Further features of the present disclosure will become apparent from the following description of exemplary embodiments with reference to the attached drawings.

BRIEF DESCRIPTION OF THE DRAWINGS

FIG. 2 is a diagram illustrating a wireless connection sequence in a Wi-Fi Direct® (WFD) mode.

FIG. 5 is a diagram illustrating an example of Extensible Markup Language (XML) data that is returned as a response result by a communication apparatus.

DESCRIPTION OF THE EMBODIMENTS

Various exemplary embodiments of the present disclosure will be described below with reference to the drawings. It should be understood that the below-described exemplary embodiments of the present disclosure that are changed or modified as needed based on ordinary knowledge of a person skilled in the art without departing from the spirit of the disclosure are also encompassed within the scope of the disclosure.

An information processing apparatus and a communication apparatus of a communication system according to a first exemplary embodiment will be described below. While a smartphone is described as an example of an information processing apparatus according to the present exemplary embodiment, this is not a limiting example, and various apparatuses such as mobile terminals, laptop personal computers (laptop PCs), tablet terminals, personal digital assistants (PDAs), and digital cameras are also applicable as the information processing apparatus. Further, various apparatuses capable of performing wireless communication with the information processing apparatus are applicable as a communication apparatus. For example, printers such as inkjet printers, full-color laser beam printers, and monochrome printers are applicable. Further, not only printers but also scanners, copy machines, facsimile apparatuses, mobile terminals, smartphones, laptop PCs, tablet terminals, PDAs, digital cameras, music reproduction devices, televisions, and smart speakers are applicable. Furthermore, multi-function peripherals with a plurality of functions such as copy, fax, print, and scanner functions are also applicable. A communication apparatus according to the present exemplary embodiment is a multi-function printer with a printing function and a scanner function.

<Hardware Configurations of Apparatuses>

Figure 1:
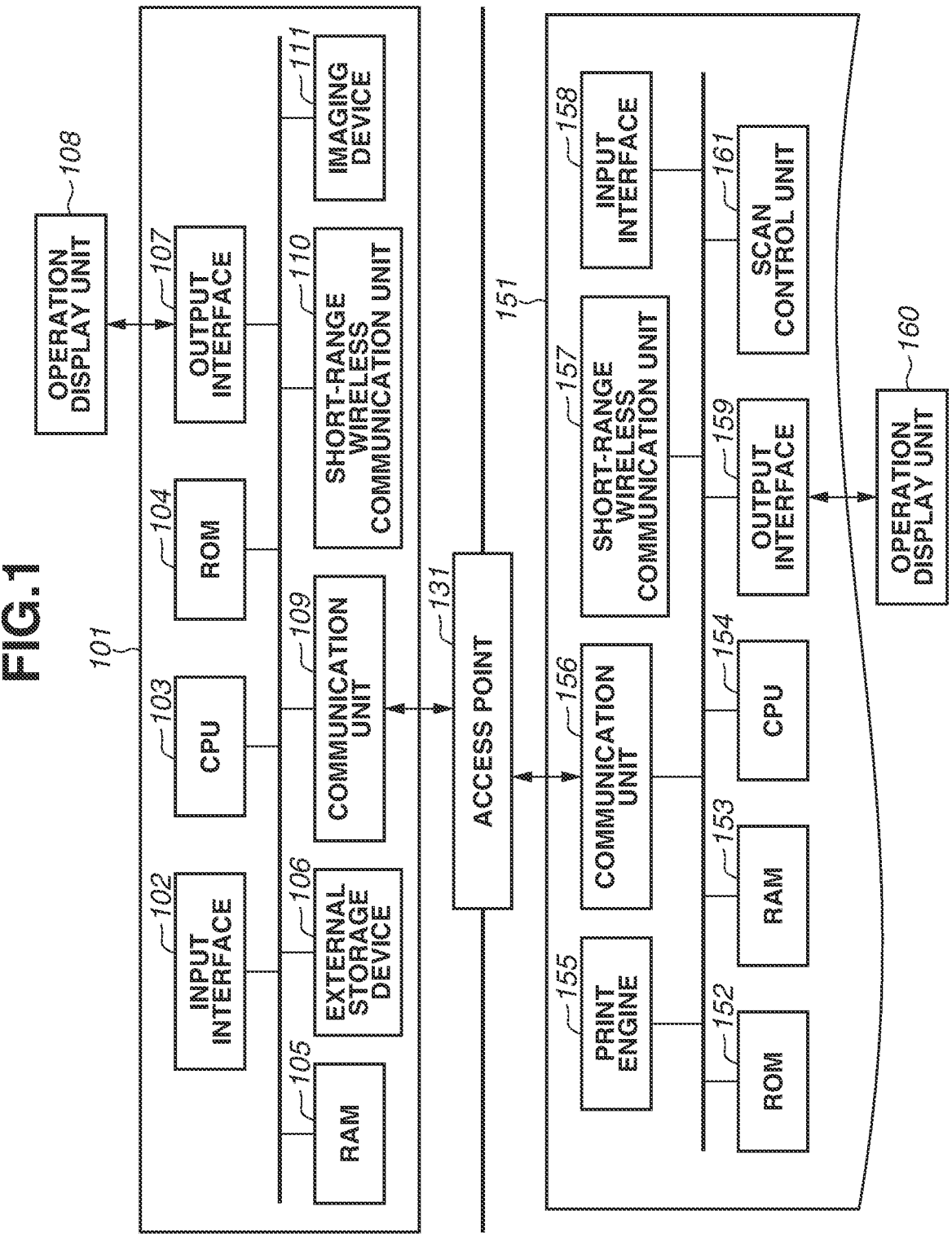
FIG. 1 is a diagram illustrating an example of a configuration of a communication system.

First, a configuration of an information processing apparatus of a communication system according to the present exemplary embodiment and a configuration of a communication apparatus capable of communicating with the information processing apparatus will be described below with reference to a block diagram in FIG. 1. Further, the configurations according to the present exemplary embodiment that are described below are mere examples and are not intended to limit the functions to those illustrated in FIG. 1.

An information processing apparatus 101 includes an input interface 102, a central processing unit (CPU) 103, a read-only memory (ROM) 104, a random access memory (RAM) 105, an external storage device 106, an output interface 107, an operation display unit 108, a communication unit 109, a short-range wireless communication unit 110, and an imaging device 111.

The input interface 102 is an interface for receiving data inputs and operation instructions from users and includes a physical keyboard, buttons, and a touch panel. The output interface 107 described below and the input interface 102 can be formed as a single configuration that outputs screens and receives operations from users.

The CPU 103 is a system control unit and controls the entire information processing apparatus 101.

The ROM 104 stores control programs that the CPU 103 executes, data tables, and fixed data such as embedded operating system (hereinafter, referred to as "embedded OS") programs. According to the present exemplary embodiment, the control programs stored in the ROM 104 perform software execution control such as scheduling, task switching, and interruption processing under the control of the embedded OS stored in the ROM 104. The OS according to the present exemplary embodiment that is held by the ROM 104 and runs on the information processing apparatus 101 is an Android (registered trademark) OS provided by Google LLC or a Chrome (registered trademark) OS provided by Google LLC. In a case where the OS that runs on the information processing apparatus 101 is a Chrome OS, the ROM 104 also holds a virtual Android OS for running an Android OS application, which will be described below, on the information processing apparatus 101.

The RAM 105 is composed of a static RAM (SRAM) that needs a backup power source. Since data is retained by the provision of a primary battery (not illustrated) for data backup, the RAM 105 can store important data such as program control variables without losing the data. Further, the RAM 105 also includes memory areas for storing settings information about the information processing apparatus 101 and management data of the information processing apparatus 101. Further, the RAM 105 is also used as a main memory and a work memory of the CPU 103.

The external storage device 106 includes an application program (hereinafter, referred to as "communication application") with a function of communicating with a communication apparatus 151. The communication application is specifically, for example, an application with a printing function of causing the communication apparatus 151 to perform printing and a scanning function of causing the communication apparatus 151 to perform scanning. The foregoing form is not a limiting example, and the communication application can be an application with one of the printing function and the scanning function or an application with another function. Further, the external storage device 106 includes various programs such as a print information generation program that generates print information interpretable by the communication apparatus 151 and an information transmission/reception control program that controls transmission and reception of information to and from the communication apparatus 151 connected via the communication unit 109.

Various types of information for use by the foregoing programs are stored. Further, image data acquired from other information processing apparatuses or the Internet via the communication unit 109 are also stored. The communication application according to the present exemplary embodiment is an Android OS application.

The output interface 107 is an interface that controls data display and notification of a state of the information processing apparatus 101 by the operation display unit 108.

The operation display unit 108 includes a light emitting diode (LED) and a liquid crystal display (LCD) and displays data and presents notifications of a state of the information processing apparatus 101. A software keyboard including numerical value input keys, a mode selection key, a set key, a cancel key, and a power key can be provided on the operation display unit 108 to receive inputs from users via the operation display unit 108.

The communication unit 109 connects to an apparatus such as the communication apparatus 151 and performs data communication. For example, the communication unit 109 can connect to an access point (not illustrated) in the communication apparatus 151. A connection between the communication unit 109 and the access point in the communication apparatus 151 enables the information processing apparatus 101 and the communication apparatus 151 to communicate with each other. Hereinafter, the access point will sometimes be referred to as "AP". The communication unit 109 can communicate directly with the communication apparatus 151 via wireless communication or can communicate with the communication apparatus 151 via an access point 131 located outside the information processing apparatus 101 and the communication apparatus 151. The Institute of Electrical and Electronics Engineers (IEEE) 802.11 series communication standards are used as a wireless communication method according to the present exemplary embodiment. The IEEE 802.11 series communication standards are specifically Wi-Fi (registered trademark).

Further, the access point 131 is a device such as a wireless local area network (wireless LAN) router. According to the present exemplary embodiment, a method in which the information processing apparatus 101 and the communication apparatus 151 are connected directly to each other without an external access point is referred to as "direct connection method". Further, a method in which the information processing apparatus 101 and the communication apparatus 151 are connected to each other via the external access point 131 is referred to as "infrastructure connection method".

The short-range wireless communication unit 110 is a configuration for wirelessly connecting to an apparatus such as the communication apparatus 151 at close proximity and performing data communication and performs communication using a different communication method from the communication unit 109. The short-range wireless communication method used by the short-range wireless communication unit 110 is, for example, Bluetooth® or Near Field Communication (NFC). Bluetooth® can be Bluetooth® Classic or Bluetooth® Low Energy. The short-range wireless communication unit 110 can connect to a short-range wireless communication unit 157 in the communication apparatus 151.

The imaging device 111 is a device that converts images captured by image sensors into digital data. The digital data is temporarily stored in the RAM 105. Thereafter, the digital data is converted into data in a predetermined image format by a program executed by a CPU 154, and the resulting data is stored as image data in the external storage device 106.

A ROM 152 stores control programs that the CPU 154 executes, data tables, and fixed data such as OS programs.

The communication apparatus 151 includes the ROM 152, a RAM 153, the CPU 154, a print engine 155, a communication unit 156, the short-range wireless communication unit 157, an input interface 158, an output interface 159, an operation display unit 160, and a scan control unit 161. The communication apparatus 151 can operate in a connection mode (communication mode) in a case where the connection mode is set for the communication apparatus 151.

The communication unit 156 is a configuration via which the communication apparatus 151 communicates with other apparatuses. According to the present exemplary embodiment, the communication unit 156 performs communication using the IEEE 802.11 series communication standards. The communication unit 156 includes, as an internal access point in the communication apparatus 151, an access point for connecting to apparatuses such as the information processing apparatus 101. The access point can connect to the communication unit 109 of the information processing apparatus 101. The communication unit 156 can communicate directly with the information processing apparatus 101 via wireless communication or can communicate with the information processing apparatus 101 via the access point 131. Further, the communication unit 156 can include hardware configured to function as an access point or can operate as an access point using software configured to cause the communication unit 156 to function as an access point. According to the present exemplary embodiment, the communication unit 156 and the short-range wireless communication unit 157 are implemented by a single wireless chip. Specifically, according to the present exemplary embodiment, a combo chip that supports both a communication function based on the IEEE 802.11 series communication standards and a communication function based on a short-range wireless communication method is used. However, this is not a limiting form, and the communication unit 156 and the short-range wireless communication unit 157 can be implemented by separate wireless chips.

The RAM 153 is composed of a dynamic RAM (DRAM) that needs a backup power source. Since data is retained by the provision of power supply for data backup (not illustrated), the RAM 153 can store important data such as program control variables without losing the data. Further, the RAM 153 is also used as a main memory and a work memory of the CPU 154 and stores a reception buffer for temporarily holding print information received from the information processing apparatus 101 and various types of information.

The ROM 152 stores control programs that the CPU 154 executes, data tables, and fixed data such as OS programs. According to the present exemplary embodiment, the control programs stored in the ROM 152 control execution of software such as scheduling, task switching, and interruption processing under the control of the embedded OS stored in the ROM 152. Further, memory areas for storing data that needs to be retained even in the absence of power supply, such as settings information about the communication apparatus 151 and management data of the communication apparatus 151, are also provided in the ROM 152.

The CPU 154 is a system control unit and controls the entire communication apparatus 151.

The print engine 155 forms an image on a recording medium, such as paper, using a recording material, such as ink, based on information stored in the RAM 153 or a print job received from the information processing apparatus 101 and outputs a printing result. At this time, the print job transmitted from the information processing apparatus 101 is received via the communication unit 156 capable of performing communication at higher speed than the short-range wireless communication unit 157 because the print job has a large transmission data size and high-speed communication is required.

The short-range wireless communication unit 157 is a configuration for wirelessly connecting to an apparatus such as the information processing apparatus 101 at close proximity and performing data communication and performs communication using a different communication method from the communication unit 156. The short-range wireless communication method used by the short-range wireless communication unit 110 is, for example, Bluetooth® or NFC. Bluetooth® can be Bluetooth® Classic or Bluetooth® Low Energy. The short-range wireless communication unit 157 can connect to the short-range wireless communication unit 110.

The input interface 158 is an interface for receiving data inputs and operation instructions from users and includes a physical keyboard, buttons, and a touch panel. The output interface 159 described below and the input interface 158 can be formed as a single configuration that outputs screens and receives operations from users. The output interface 159 is an interface that controls data display and notification of a state of the communication apparatus 151 by the operation display unit 160.

The operation display unit 160 includes a display unit such as a LED and a LCD and displays data and presents notifications of a state of the communication apparatus 151. A software keyboard including numerical value input keys, a mode selection key, a set key, a cancel key, and a power key can be provided on the operation display unit 160 to receive inputs from users via the operation display unit 160.

The scan control unit 161 includes an image sensor unit (reading unit) configured to scan a document placed on a platen glass (not illustrated) or an automatic document feeder (ADF) (not illustrated). The image sensor unit includes a light source that emits light to the document and an image sensor including an array of elements that read reflection light from the document and photoelectrically convert the light. The scan control unit 161 acquires image data by performing analog/digital (A/D) conversion on analog electric signals obtained by reading the document using the image sensor unit. The scan control unit 161 further includes a circuit that performs direct memory access (DMA) transfer to store acquired image data in the RAM 153.

<Direct Connection Method>

The direct connection refers to a form of wirelessly connecting devices directly to each other (i.e., peer-to-peer) without an external device such as the access point 131. The communication apparatus 151 is operable in a mode (direct connection mode) for performing communication via a direct connection as one of connection modes. There is a plurality of modes for performing communication via a direct connection in Wi-Fi communication, such as a software AP mode and a Wi-Fi Direct® mode. Hereinafter, Wi-Fi Direct will be referred to as "WFD".

A mode in which a direct connection is performed using WFD is referred to as "WFD mode". WFD is a standard established by the Wi-Fi Alliance and is included in the IEEE 802.11 series communication standards. In the WFD mode, after a communication partner device search is performed using device search information, the roles of a peer-to-peer (P2P) group owner (GO) and a P2P client are determined, and then the remaining wireless connection process is performed. The group owner corresponds to a Wi-Fi master station (master device), and the client corresponds to a Wi-Fi slave station (slave device).

The role determination corresponds to, for example, the P2P GO Negotiation. In the WFD mode in a state before the role determination is performed, the communication apparatus 151 is in the state of being neither a master station nor a slave station. Specifically, first, one of devices that are to communicate with each other issues device search information and searches for a device that is a connection target in the WFD mode. If another device that is to be a communication partner is detected, the devices check information about services and functions that the devices can provide. This device provision information check is optional and not mandatory. The device provision information check phase corresponds to, for example, the P2P Provision Discovery. Next, the devices check the device provision information about each other to determine one of the devices as a P2P client and the other as a P2P group owner. Next, after the client and the group owner are determined, the client and the group owner exchange parameters for performing WFD communication. Based on the exchanged parameters, the P2P client and the P2P group owner perform the remaining wireless connection process and an Internet Protocol (IP) connection process. In the WFD mode, the communication apparatus 151 can always operate as a "GO" without performing the above-described GO Negotiation. Specifically, the communication apparatus 151 can operate in the WFD mode that is an Autonomous GO mode. Further, a state where the communication apparatus 151 is operating in the WFD mode is specifically, for example, a state where no WFD connection is established and the communication apparatus 151 is operating as a GO or a state where a WFD connection is established and the communication apparatus 151 is operating as a GO.

In a software AP mode, one (e.g., the information processing apparatus 101) of devices that are to communicate with each other (e.g., the information processing apparatus 101 and the communication apparatus 151) becomes a client to play the role of requesting various services. Then, the other device implements a Wi-Fi access point function though software configuration. The software AP corresponds to a Wi-Fi master station, and the client corresponds to a Wi-Fi slave station. In the software AP mode, the client searches for a software AP device using device search information. If a software AP is detected, the client and the software AP perform the remaining wireless connection process (such as establishment of a wireless connection) and thereafter an IP connection process (such as IP address allocation). Commands and parameters that are specified by the Wi-Fi standard can be used as commands and parameters that are transmitted and received in implementing a wireless connection between the client and the software AP, and descriptions thereof are omitted herein.

According to the present exemplary embodiment, in a case where the communication apparatus 151 establishes and maintains a direct connection, the communication apparatus 151 operates as a master station in the network to which the communication apparatus 151 belongs. The term "master station" refers to an apparatus that builds a wireless network and provides parameters for use in connecting to the wireless network to the slave station. The parameters for use in connecting to the wireless network are, for example, parameters relating to channels that the master station uses. The slave station receives the parameters to connect to the wireless network built by the master station using the channel used by the master station. In the direct connection mode, since the communication apparatus 151 operates as a master station, the communication apparatus 151 can select which frequency band and channel to use in the communication in the direct connection mode. According to the present exemplary embodiment, the communication apparatus 151 can use channels corresponding to the 2.4-GHz frequency band and channels corresponding to the 5-GHz frequency band in the communication in the direct connection mode. Further, a user can arbitrarily set which frequency band to use (i.e., which channel of which frequency band to use) on a screen displayed by the communication apparatus 151. According to the present exemplary embodiment, even in a case where 5 GHz is selected on the screen displayed on the communication apparatus 151, the communication apparatus 151 does not use channels corresponding to the Dynamic Frequency Selection (DFS) band of the 5-GHz frequency band in the communication in the direct connection mode. In other words, the communication apparatus 151 uses only the channels corresponding to the portion of the 5-GHz frequency band other than the DFS band in the communication in the direct connection mode. In a case where a radar wave of a frequency band corresponding to a channel corresponding to the DFS band is detected while the channel is being used, the channel needs to be changed. The frequency band in which the detection of a radar wave may mandate a channel change is referred to as "DFS band". In a case where, for example, a wireless chip that supports the DFS function is used, use of the channels corresponding to the DFS band of the 5-GHz frequency band in the communication in the direct connection mode can be enabled.

FIG. 2 is a diagram illustrating a wireless connection sequence in the WFD mode. A CPU of an apparatus reads various programs stored in a memory such as a ROM of the apparatus to a RAM of the apparatus and executes the read programs to implement a process that is to be performed by the apparatus in the sequence. Further, the processes are started in a case where a predetermined operation for establishing a WFD connection is received from a user in a state where the apparatuses have activated a predetermined application for performing the WFD function. The predetermined operation for establishing a WFD connection is, for example, an operation of selecting an "enable/disable direct connection mode" button. The operation corresponds to an operation for activating the direct connection mode.

First, in step S201, the information processing apparatus 101 transmits device search information and searches for an apparatus that supports the WFD function as a communication partner apparatus.

Next, in step S202, in a case where the received device search information is information transmitted using the same channel as the channel that is currently used in the direct connection mode, the communication apparatus 151 transmits a device search response as a response to the information to the information processing apparatus 101. Consequently, the information processing apparatus 101 discovers the communication apparatus 151 as an apparatus that supports the WFD function. After the information processing apparatus 101 discovers the communication apparatus 151, the information processing apparatus 101 and the communication apparatus 151 can perform a process of exchanging information about services and functions that the information processing apparatus 101 and the communication apparatus 151 can provide.

Next, in step S203, the information processing apparatus 101 and the communication apparatus 151 perform GO Negotiation. After a client and a group owner are determined, the client and the group owner exchange parameters for communicating with each other using WFD. Based on the exchanged parameters, the P2P client and the P2P group owner perform the remaining wireless connection process and an IP connection process. As described above, the communication apparatus 151 can operate in the Autonomous GO mode so that the GO Negotiation is skipped and the communication apparatus 151 always operates as a GO. Further, in a case where the communication apparatus 151 operates as a GO, the communication apparatus 151 as the master station selects a frequency band and a channel to use in the WFD communication. Thus, the communication apparatus 151 operating as a GO can select which one of the 5-GHz and 2.4-GHz frequency bands to use and which one of the channels corresponding to the selected frequency band to use.

Thereafter, in step S204, the information processing apparatus 101 and the communication apparatus 151 perform wireless connection establishment processing using WFD based on the exchanged parameters using the channel selected by the GO.

<Infrastructure Connection Method>

The infrastructure connection is a connection form in which devices (e.g., the information processing apparatus 101 and the communication apparatus 151) that perform communication connect to an access point (e.g., the access point 131) controlling a network of the devices and communicate with each other via the access point. The communication apparatus 151 is also operable in a mode (infrastructure connection mode) for performing communication via an infrastructure connection as one of the connection modes.

In the infrastructure connection, each device searches for an access point using device search information. In a case where an access point is detected, the device and the access point perform the remaining wireless connection process (such as establishment of a wireless connection) and thereafter an IP connection process (such as IP address allocation). Commands and parameters that are specified by the Wi-Fi standard can be used as commands and parameters that are transmitted and received in implementing a wireless connection between the device and the access point, and descriptions thereof are omitted herein.

According to the present exemplary embodiment, in a case where the communication apparatus 151 operates in the infrastructure connection mode, the access point 131 operates as a master station, and the communication apparatus 151 operates as a slave device. Specifically, according to the present exemplary embodiment, the infrastructure connection refers to a connection between the communication apparatus 151 operating as a slave device and an apparatus operating as a master device. In a case where the communication apparatus 151 has established an infrastructure connection and the information processing apparatus 101 has established an infrastructure connection with the access point 131, the communication apparatus 151 and the information processing apparatus 101 can communicate with each other via the access point 131. Since a channel for use in the communication via the infrastructure connection is selected by the access point 131, the communication apparatus 151 performs communication via the infrastructure connection using the channel selected by the access point 131. According to the present exemplary embodiment, the communication apparatus 151 can use the channels corresponding to the 2.4-GHz frequency band and the channels corresponding to the 5-GHz frequency band in the communication via the infrastructure connection. The communication apparatus 151 can also use the channels corresponding to the DFS band of the 5-GHz frequency band in the communication via the infrastructure connection. To communicate with the communication apparatus 151 via the access point 131, the information processing apparatus 101 needs to recognize that the communication apparatus 151 belongs to the network which is formed by the access point 131 and to which the information processing apparatus 101 belongs.

Further, in a case where the information processing apparatus 101 and the communication apparatus 151 are connected to each other via the infrastructure connection via the access point 131, the communication apparatus 151 can be discovered through a broadcast performed by the information processing apparatus 101.

<Software Configuration of Information Processing Apparatus 101>

Next, a software configuration of the information processing apparatus 101 according to the present exemplary embodiment will be described below.

Figure 3A:
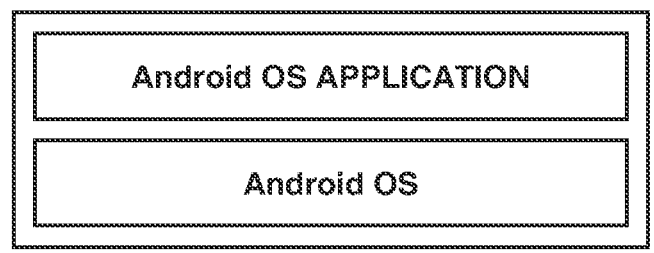
FIGS. 3A and 3B are diagrams illustrating a software configuration of an information processing apparatus.

FIG. 3A illustrates an example of a software configuration of the information processing apparatus 101 in a case where a host OS running on the information processing apparatus 101 is an Android OS. In this form, an Android OS application runs on the Android OS. In this form, the software configuration of the information processing apparatus 101 does not include a Chrome OS. An environment in which an OS running on the lowest layer of the information processing apparatus 101 is an Android OS (not a Chrome OS) as in the above-described form will be referred to as "first environment" hereinafter. The first environment is specifically, for example, an environment in which a host OS is installed in the information processing apparatus 101 while no guest OS is installed in the information processing apparatus 101 and the communication application runs on the host OS. Further, the first environment is specifically, for example, an environment in which both a host OS and a guest OS are installed in the information processing apparatus 101 and the communication application runs on the host OS without using the guest OS (the communication application does not run on the guest OS).

Figure 3B:
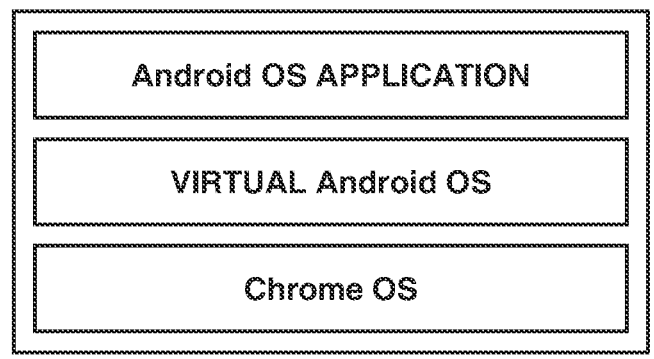

FIG. 3B illustrates an example of a software configuration of the information processing apparatus 101 in a case where the host OS running on the information processing apparatus 101 is a Chrome OS. In this form, a virtual Android OS, which is a virtual OS, runs on the Chrome OS. Further, an Android OS application runs on the virtual Android OS. An environment in which an OS running on the lowest layer of the information processing apparatus 101 is a Chrome OS and a virtual Android OS runs on the Chrome OS as in the above-described form will be referred to as "second environment". According to the present exemplary embodiment, the virtual OS is a program for causing an application that does not support a host OS to run on the host OS and is a guest OS. The virtual OS can be an entire existing OS such as an Android OS, an entire existing OS with some modules omitted, or a program generated separately from an existing OS. Further, the virtual OS is implemented by, for example, a virtualization technology such as a virtual machine method or a container method.

Running an Android OS application in the second environment causes the following issues.

First, there is a conventional broadcast search method known as a method for searching for a communication partner apparatus by the information processing apparatus 101 using the communication application. The broadcast search is a method for discovering an apparatus by transmitting a broadcast search packet and receiving a response. Specifically, in the broadcast search, first, the communication application executes a socket application programming interface (socket API) and instructs the OS of the information processing apparatus 101 to transmit a broadcast search packet. Then, the OS transmits a broadcast search packet to an access point (which is the access point 131 herein) forming a network to which the information processing apparatus 101 belongs (is connected). The broadcast search packet is a packet in which a broadcast search value corresponding to not specifying a packet transmission destination is set in an area where an IP address is stored. According to the present exemplary embodiment, the communication application determines the content of the broadcast search packet. Specifically, an apparatus capable of interpreting the content of the broadcast search packet is an apparatus that supports the communication application. A specific example of an apparatus that supports the communication application is a printing apparatus provided by a vendor of the communication application. According to the present exemplary embodiment, the communication apparatus 151 is an apparatus that supports the communication application. The access point 131 having received the broadcast search packet transmits the packet to all apparatuses that belong to the network formed by the access point 131. Then, in a case where an apparatus capable of interpreting the packet receives the packet, the apparatus transmits a response to the information processing apparatus 101, which is the transmission source of the packet, via the access point 131. Then, the OS of the information processing apparatus 101 receives the response and transmits the received response to the communication application. This enables the information processing apparatus 101 to discover each apparatus having transmitted a response using the communication application, and the information processing apparatus 101 can perform a process based on the broadcast search result. The process based on the search result is specifically, for example, a process of displaying the search result or a process of communicating with an apparatus discovered by the search.

Further, there is a multicast search method known as a method for searching for a communication partner apparatus by the information processing apparatus 101 using the communication application. The multicast search is a method for discovering an apparatus by transmitting a multicast search packet and receiving a response. Specifically, in the multicast search, first, the communication application executes a socket API and instructs the OS of the information processing apparatus 101 to transmit a multicast search packet. Then, the OS transmits a multicast search packet to an access point (which is the access point 131 here) forming the network to which the information processing apparatus 101 belongs (is connected). The multicast search packet is a packet in which a multicast search value corresponding to specifying a specific type of an apparatus as a packet transmission destination is set in an area where an IP address is stored. According to the present exemplary embodiment, the communication application determines the content of the multicast search packet. Specifically, an apparatus capable of interpreting the content of the multicast search packet is an apparatus that supports the communication application. The access point 131 having received the multicast search packet transmits the packet to each apparatus of the type specified by the multicast search packet among the apparatuses that belong to the network formed by the access point 131. Then, in a case where an apparatus capable of interpreting the packet receives the packet, the apparatus transmits a response to the information processing apparatus 101, which is the transmission source of the packet, via the access point 131. Then, the OS of the information processing apparatus 101 receives the response and transmits the received response to the communication application. This enables the information processing apparatus 101 to discover each apparatus having transmitted a response using the communication application, and the information processing apparatus 101 can perform a process based on the multicast search result.

While the determination of the content of the broadcast search packet or the multicast search packet is performed by the communication application, the transmission of the packets is performed by the OS running on the lowest layer of the information processing apparatus 101. Thus, in an environment where an Android OS application is running in the second environment, the Chrome OS is to perform a broadcast search or a multicast search. However, in a case where an Android OS application is running in the second environment, a firewall of the Chrome OS sometimes performs control such that a broadcast search or a multicast search is not performed that is instructed by the Android OS application and uses the socket API. This leads to an issue that the communication application may not be able to perform a process based on a broadcast search result or a multicast search result in a case where the communication application is running in the second environment. On the other hand, broadcast searches and multicast searches that are instructed by a Chrome OS application are not blocked by the firewall of the Chrome OS. Thus, in a case where the information processing apparatus 101 runs a Chrome OS application on the Chrome OS and the Chrome OS application issues an instruction to perform a broadcast search or a multicast search using the socket API, the Chrome OS is able to perform the broadcast search or the multicast search.

Further, according to the present exemplary embodiment, the communication application supports the apparatus search using WFD. Thus, in a case where the information processing apparatus 101 on which the communication application is running supports WFD, the communication application can instruct the OS of the information processing apparatus 101 to perform an apparatus search using WFD, and by receiving a result of the search, the communication application can perform a process based on the result of the search.

However, there are many cases where an apparatus search using WFD cannot be performed because an apparatus in which a Chrome OS is installed or a chrome OS does not support WFD. In a case where the communication application is running in the second environment, there is an issue that the communication application cannot perform a process based on a result of an apparatus search using WFD.

Further, according to the present exemplary embodiment, the communication application has a function (scanning function) of transmitting a scan job for causing the communication apparatus 151 to perform scanning to the communication apparatus 151 and acquiring image data (scan data) acquired by the scanning performed based on the scan job from the communication apparatus 151. However, in a case where the communication application is running in the second environment, there is an issue that the communication application may not be able to acquire the scan data acquired by the communication apparatus 151.

To transmit a scan job to the communication apparatus 151, which performs push scanning, the communication application activates a Web-based Distributed Authoring and Versioning (WebDAV) server in the communication application. At this time, in a case where the environment in which the communication application is running is the second environment, the virtual Android OS allocates an IP address of a virtual interface configured as an interface for use by the WebDAV server. This IP address will be referred to as "first address". Then, the communication application instructs the virtual Android OS to transmit a scan job. The scan job here includes the first address as a transmission source address, an IP address of the communication apparatus 151 as a transmission destination address, and a first port number as a transmission source port number. Thereafter, the virtual Android OS instructs the Chrome OS to transmit the scan job. At this time, the Chrome OS performs Network Address Translation (NAT), which is an address translation process. Specifically, for example, the Chrome OS translates the transmission source address from the first address into a second address and translates the transmission source port number from the first port number into a second port number. Thereafter, the scan job is transmitted to the communication apparatus 151 using the translated address and the translated port number. The translated address is stored in a header of a packet of the scan job.

The communication apparatus 151 here is an apparatus that performs push scanning. Thus, when the scan job is received by the communication apparatus 151, the communication session between the information processing apparatus 101 and the communication apparatus 151 is temporarily disconnected. Thus, in order for the communication apparatus 151 to transmit scan data to the information processing apparatus 101, the communication session between the information processing apparatus 101 and the communication apparatus 151 is to be established again.

In this case, the communication apparatus 151 is to designate an IP address that specifies a transmission destination of the scan data. However, as described above, the scan job received by the communication apparatus 151 contains the second address, which is the IP address translated from the first address by the chrome OS. Thus, the communication apparatus 151 cannot acquire the first address. Further, even if the first address is successfully acquired by referring to the first address included in a non-header portion of the packet of the scan job, since the first address is a private IP address inside the information processing apparatus 101, the communication apparatus 151 cannot transmit data to the first address in the newly-established session. As a result, there is an issue that in the second environment, the communication application may not be able to acquire scan data obtained by a scan performed by the communication apparatus 151 based on a scan job for causing the communication apparatus 151 to perform push scanning.

<Apparatus Search by Communication Application>

Figure 4:
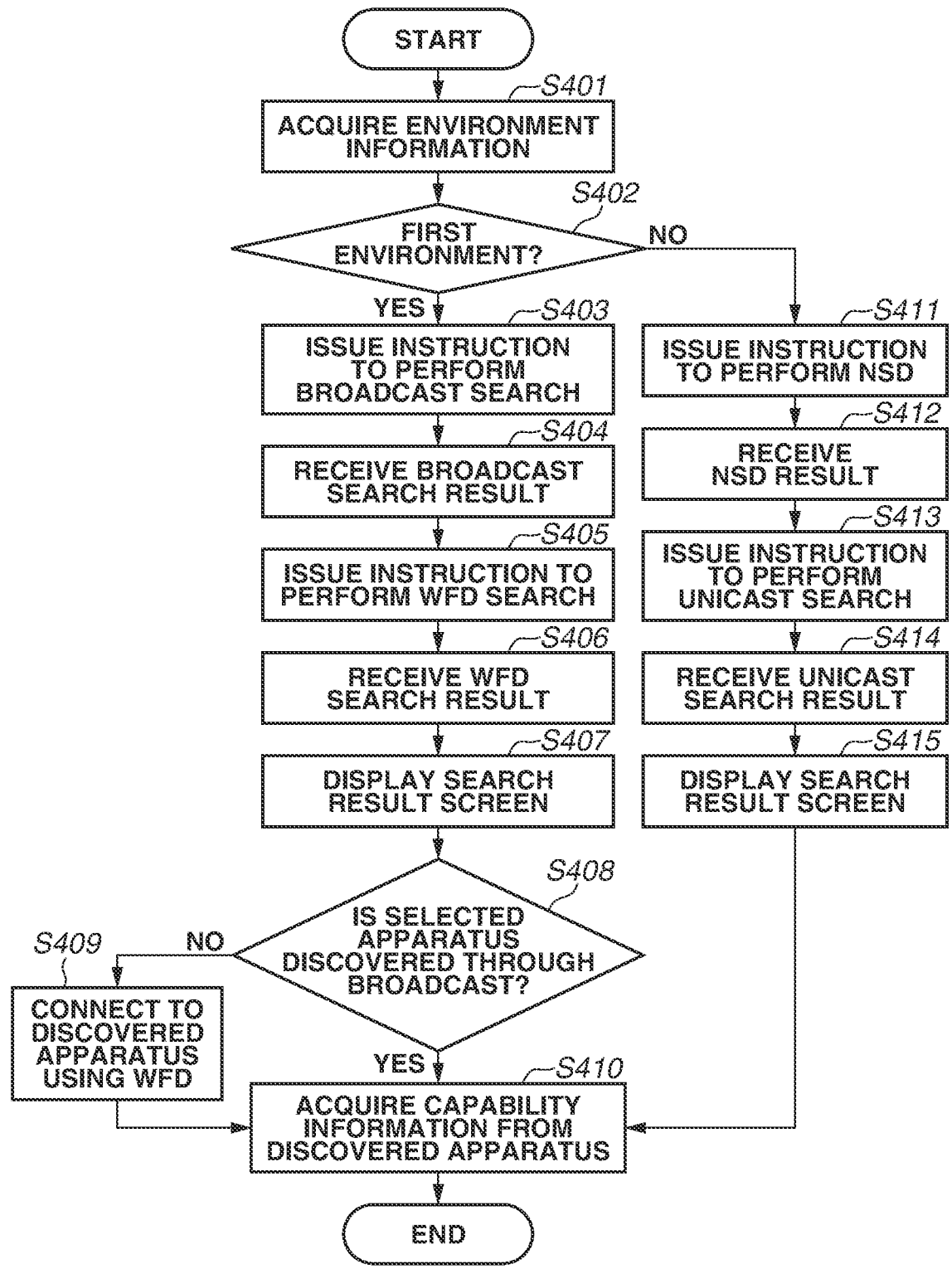
FIG. 4 is a flowchart illustrating a search for an apparatus using a communication application.

FIG. 4 is a flowchart illustrating an apparatus search by the communication application according to the present exemplary embodiment. The CPU 103 reads various programs stored in a memory such as the external storage device 106 to the RAM 105 and executes the read programs to thereby implement the flowchart. Specifically, the flowchart is implemented by executing the communication application. Further, the process is started in a case where an operation that triggers performance of an apparatus search is performed by a user on a screen displayed by the communication application. This is not a limiting form, and the process can be started in a case where, for example, the communication application is activated.

In step S401, the CPU 103 executes an Android OS application programming interface (Android OS API) from the communication application and acquires environment information about an environment in which the communication application is running. In a case where the environment in which the communication application is running is the first environment, information corresponding to the first environment is acquired as environment information. On the other hand, in a case where the environment in which the communication application is running is the second environment, the executed API is a virtual Android OS API, and information corresponding to the second environment is acquired as environment information.

In step S402, the CPU 103 determines whether the environment in which the communication application is running is the first environment, based on the environment information acquired in step S401. In a case where the determination result is YES (YES in step S402), the processing proceeds to step S403, whereas in a case where the determination result is NO (NO in step S402), the processing proceeds to step S411.

In step S403, the CPU 103 determines the content of a broadcast search packet using the communication application. Then, the CPU 103 executes the socket API from the communication application to instruct the Android OS to transmit the packet with the determined content using the communication application. Specifically, the CPU 103 performs a broadcast search process using the communication application. By this process, the CPU 103 performs transmission of the broadcast search packet to the access point 131 using the Android OS. Further, according to the present exemplary embodiment, the broadcast search packet is configured so that only apparatuses that support the communication application can respond to the packet. Further, according to the present exemplary embodiment, a plurality of types of broadcast search packets is broadcast. Specifically, the plurality of types of broadcast search packets includes a type of a packet that is configured so that only inkjet printers can respond and a type of a packet that is configured so that only electrophotographic printers can respond. Further, a type of a packet that is configured so that only old-model inkjet printers can respond and a type of a packet that is configured so that only new-model inkjet printers can respond can be included. Specifically, for example, the CPU 103 controls and changes a search target apparatus by changing the port number set in the broadcast search packet. This makes it possible to discover only an intended apparatus through the broadcast search. Furthermore, which apparatus the apparatus discovered through the broadcast search is (whether the discovered apparatus is an inkjet printer or an electrophotographic printer) is identified.

In step S404, the CPU 103 acquires a response to the broadcast search packet from the Android OS using the communication application. By this process, each apparatus that is a transmission source of the response is identified as an apparatus discovered by the broadcast. FIG. 5 illustrates an example of Extensible Markup Language (XML) data that the communication apparatus 151 returns as a response result to the broadcast. A status tag represents a response result to an inquiry, and in this example, the status tag indicates that the inquiry has been successful. Further, a device_type tag represents a device type, and a model_name tag represents a device model name. Since the information processing apparatus 101 can recognize that a device with information as a printer in the device_type tag is a printer, this example indicates that the device type and the model name of the communication apparatus are respectively "printer" and "communication apparatus 151". Further, an ip_address tag represents an IP address of the communication apparatus, and this example indicates that the IP address of the communication apparatus is 192.168.0.2. Further, a mac_address tag represents a Media Access Control (MAC) address of the communication apparatus and indicates that the MAC address is aa:bb:cc:dd:ee:ff. Information described in data that the communication apparatus returns as a response result and a format of the data are not limited to those described above, and various types of information about the communication apparatus can be described.

While the broadcast search process is performed in steps S403 and S404 in the above-described form, a multicast search process can be performed. Specifically, in step S403, the CPU 103 can determine the content of a multicast search packet using the communication application and can execute the socket API from the communication application to instruct the Android OS to transmit the packet with the determined content using the communication application. Then, in step S404, the CPU 103 can acquire a response to the multicast search packet from the Android OS using the communication application.

In step S405, the CPU 103 executes an API for WFD to instruct the Android OS to perform a WFD search (i.e., transmission of device search information using WFD) using the communication application. By this process, the CPU 103 performs transmission of device search information using the Android OS. Thereafter, the Android OS receives a device search response from WFD-enabled devices near the information processing apparatus 101. This process corresponds to the process of steps S201 and S202.

In step S406, the CPU 103 acquires a device search response from the Android OS using the communication application. By this process, each apparatus that is a transmission source of the device search response is identified as an apparatus discovered by the WFD search. At this time, only apparatuses that support the printing service among the apparatuses that are a transmission source of the device search response can be identified as an apparatus discovered by the WFD search. Which apparatus supports which service can be checked via communication between the apparatuses that are a transmission source of the device search response and the information processing apparatus 101.

In step S407, the CPU 103 displays a search result screen based on the information acquired in steps S404 and S406 using the communication application. The search result screen is a screen that displays a list of one or more apparatuses discovered by the broadcast search and one or more apparatuses discovered by the WFD search. On the search result screen, the list can be displayed so that the one or more apparatuses discovered by the broadcast search and the one or more apparatuses discovered by the WFD search are distinguished from each other. Specifically, for example, on the search result screen, each display item corresponding to an apparatus discovered by the broadcast search can be provided with an icon indicating that the apparatus is an apparatus discovered by the broadcast search. Similarly, on the search result screen, each display item corresponding to an apparatus discovered by the WFD search can be provided with an icon indicating that the apparatus is an apparatus discovered by the WFD search. Further, on the search result screen, the list can be displayed so that inkjet printers and electrophotographic printers are distinguished from each other. Then, the CPU 103 receives selection of one of the apparatuses displayed on the search result screen from a user using the communication application.

In step S408, the CPU 103 determines whether the selected apparatus is an apparatus discovered by the broadcast. In a case where the determination result is YES (YES in step S408), the processing proceeds to step S410, whereas in a case where the determination result is NO (NO in step S408), the processing proceeds to step S409.

In step S409, the CPU 103 instructs the Android OS to establish a WFD connection between the selected apparatus and the information processing apparatus 101 using the communication application. Consequently, the Android OS performs a process for establishing a WFD connection between the selected apparatus and the information processing apparatus 101. This process corresponds to the process of steps S203 and S204. According to the present exemplary embodiment, the information processing apparatus 101 can simultaneously maintain a WFD connection and a normal Wi-Fi connection. Thus, the CPU 103 herein establishes a WFD connection between the selected apparatus and the information processing apparatus 101 with the Wi-Fi connection between the access point 131 and the information processing apparatus 101 maintained.

In step S410, the CPU 103 acquires capability information from the selected apparatus. Specifically, the capability information includes information indicating whether the apparatus supports the printing function and the scanning function, information indicating whether the apparatus supports two-sided printing and color/monochrome printing, and information about types of recording materials and recording media that the apparatus supports. The capability information can include identification information about the apparatus, such as a MAC address, a model name, and an IP address. The communication application registers the selected apparatus in the communication application by managing the selected apparatus and the capability information in association with each other. Thereafter, the communication application can transmit various jobs to the apparatuses registered in the communication application.

Furthermore, the communication application can cause the apparatuses registered in the communication application to perform processes corresponding to various jobs. Thereafter, the process in the flowchart ends.

On the other hand, in a case where the determination result in step S402 is NO (NO in step S402), in step S411, the CPU 103 performs a process for searching for an apparatus on the network to which the information processing apparatus 101 belongs using an API different from the socket API using the communication application. Specifically, the API used here is a network service discovery (NSD) API. As the API is executed from the communication application, a search referred to as NSD is performed. NSD is a multicast search that is performed using a Domain Name System (DNS) based service discovery protocol. Further, NSD is a search that can be performed also in the second environment based on an instruction from the communication application. In this process, specifically, as the API is executed from the communication application, the virtual Android OS instructs the Chrome OS to perform an NSD. Then, the Chrome OS performs an NSD to discover apparatuses that support NSD and are on the network to which the information processing apparatus 101 belongs. In executing the NSD API, the communication application can designate a service to search for apparatuses that support the designated service using NSD. The designation of a service is performed by, for example, designating a protocol. Thus, according to the present exemplary embodiment, the communication application designates the Internet Printing Protocol (IPP) to designate a search for apparatuses that support the printing service (i.e., printer). The communication application designates an IP address as designation of a packet transmission destination apparatus in a search instruction using the socket API, whereas the communication application does not designate an IP address in a search instruction using the NSD API.

Next, in step S412, the CPU 103 acquires, as an NSD search result, information about the discovered apparatuses using the communication application. The acquired information here is specifically, for example, an IP address, a port number, and a service name of each discovered apparatus.

Next, in step S413, the CPU 103 performs a process for performing a unicast search for one or more apparatuses discovered by the NSD. According to the present exemplary embodiment, a process for performing a unicast search for all apparatuses discovered by the NSD is performed, but this is not a limiting form. A process for performing a unicast search for some of the apparatuses discovered by the NSD can be performed. The unicast search refers to a method of designating an IP address of a search target apparatus and performing a search using the designated IP address on the network to which the information processing apparatus 101 belongs. Since the IP addresses of the apparatuses discovered by the NSD have been acquired as the NSD search result by the communication application, the apparatuses discovered by the NSD can be searched again through a unicast search. A search target range of the broadcast search falls within a sub-network to which the information processing apparatus 101 belongs, whereas a search target range of the unicast search includes not only the sub-network to which the information processing apparatus 101 belongs but also other sub-networks connected to the sub-network. The term "sub-network" refers to a unit of a single network formed by a single access point. The unicast search is a search that can be performed also in the second environment based on an instruction from the communication application. In this process, specifically, the CPU 103 determines the content of a unicast search packet using the communication application. Then, the CPU 103 executes the socket API to instruct the virtual Android OS to transmit the packet with the determined content using the communication application. The unicast search packet is a packet in which a unicast search value corresponding to specifying a packet transmission destination (i.e., search target apparatus destination) is set in an area where an IP address is stored. Further, according to the present exemplary embodiment, the unicast search packet is configured so that only apparatuses that support the communication application can respond to the packet. Further, according to the present exemplary embodiment, a plurality of types of unicast search packets is transmitted to a single apparatus. Specifically, the plurality of types of unicast search packets includes a type of a packet that is configured so that only inkjet printers can respond and a type of a packet that is configured so that only electrophotographic printers can respond. A type of a packet that is configured so that only old-model inkjet printers can respond and a type of a packet that is configured so that only new-model inkjet printers can respond can be included. This makes it possible to discover only an intended apparatus through a unicast search. Furthermore, which apparatus the apparatus discovered through the unicast search is (whether the discovered apparatus is an inkjet printer or an electrophotographic printer) is identified. According to the present exemplary embodiment, the IP address specifying the packet transmission destination is the only difference between the content of the unicast search packet and the content of the broadcast search packet. Thereafter, the virtual Android OS instructs the Chrome OS to perform a unicast search. Then, the Chrome OS transmits a unicast search packet to perform a unicast search. Consequently, a response from an apparatus that corresponds to the IP address designated in the unicast search packet and is on the network to which the information processing apparatus 101 belongs is received, and the apparatus is discovered.

Next, in step S414, the CPU 103 acquires, as a unicast search result, information about each discovered apparatus using the communication application. The acquired information here is specifically, for example, the IP address, the MAC address, the model name (device model name), and the serial number of the discovered apparatus. By performing the unicast search after the NSD, the apparatuses that support the communication application among the apparatuses discovered by the NSD are identified. Furthermore, information that is not acquired by the NSD is acquired.

Next, in step S415, the CPU 103 displays a search result screen using the communication application. The search result screen is a screen that displays a list of apparatuses discovered by the unicast search. On the search result screen, the list can be displayed so that inkjet printers and electrophotographic printers are distinguished from each other. Then, the CPU 103 receives selection of one of the apparatuses displayed on the search result screen from a user using the communication application. Thereafter, the processing proceeds to step S410, and the CPU 103 registers the selected apparatus.

As described above, according to the present exemplary embodiment, whether to perform a broadcast search is selected based on the environment in which the communication application is running. Specifically, in a case where the environment in which the communication application is running is the first environment, a broadcast search is performed, whereas in a case where the environment in which the communication application is running is the second environment, another process is performed without performing a broadcast search. Specifically, the other process is, for example, an NSD search or a unicast search. This enables the communication application to perform an appropriate process based on the environment in which the communication application is running.

The communication application selects which one of an instruction to perform a broadcast search, an instruction to perform a multicast search, and an instruction to perform a unicast search is to be issued, by selecting the content of an address as an IP address that is designated at the time of executing the socket API and is included in a packet that is transmitted for a search. Thus, in other words, the present exemplary embodiment is a form of switching the content of an IP address designated in a packet for use in a search based on the environment in which the communication application is running.

The process that is performed in a case where the environment in which the communication application is running is the second environment is not limited to the above-described form. The process can be, for example, a process of displaying a notification screen for notifying a user that the broadcast search cannot be performed. In the form in which the notification screen is displayed, the NSD search and the unicast search do not have to be performed. Further, the notification screen can be, for example, a screen for notifying a user that the environment in which the communication application is running is the second environment, a screen for notifying a user that a communication apparatus cannot be registered in the communication application, or a screen for prompting a user to run the communication application in the first environment.

Further, the search methods are not limited to the above-described methods. For example, the process for a broadcast search (step S403, step S404) and the process for a WFD search (step S405, step S406) can be performed in a reversed order or in parallel. Further, instead of displaying the search result screen after the searches end, each time an apparatus is discovered by the searches, the discovered apparatus can be added to the search result screen.

Further, the communication application can be configured to receive, from a user, an operation of issuing an instruction to perform a broadcast search and an operation of issuing an instruction to perform a WFD search separately. Then, in a case where an operation of issuing an instruction to perform a broadcast search is performed, the flowchart in FIG. 4 can be performed without performing the process for a WFD search. Similarly, in a case where an operation of issuing an instruction to perform a WFD search is performed, the flowchart in FIG. 4 can be performed without performing the process for a broadcast search. Further, the communication application can be an application that supports only one of the broadcast search and the WFD search. Specifically, in a case where the communication application is an application that supports only the broadcast search, the flowchart in FIG. 4 can be performed without performing the process for a WFD search. Similarly, in a case where the communication application is an application that supports only the WFD search, the flowchart in FIG. 4 can be performed without performing the process for a broadcast search.

Further, while the process for a unicast search (step S413, step S414) is performed after the process for an NSD (step S411, step S412) in the above-described form, this is not a limiting form. For example, the apparatuses discovered by the NSD can be displayed on the search result screen without performing the process for a unicast search in the flowchart in FIG. 4. In this form, each apparatus that supports the communication application can store, as a response to the NSD, information indicating that the apparatus supports the communication application. Then, among the apparatuses discovered by the NSD, only the apparatuses that support the communication application can be displayed on the search result screen.

<Performance of Scan Function by Communication Application>

In a case where the communication apparatus 151 is registered in the communication application as described above, the communication application can transmit a scan job to the registered communication apparatus 151.

Figure 6:
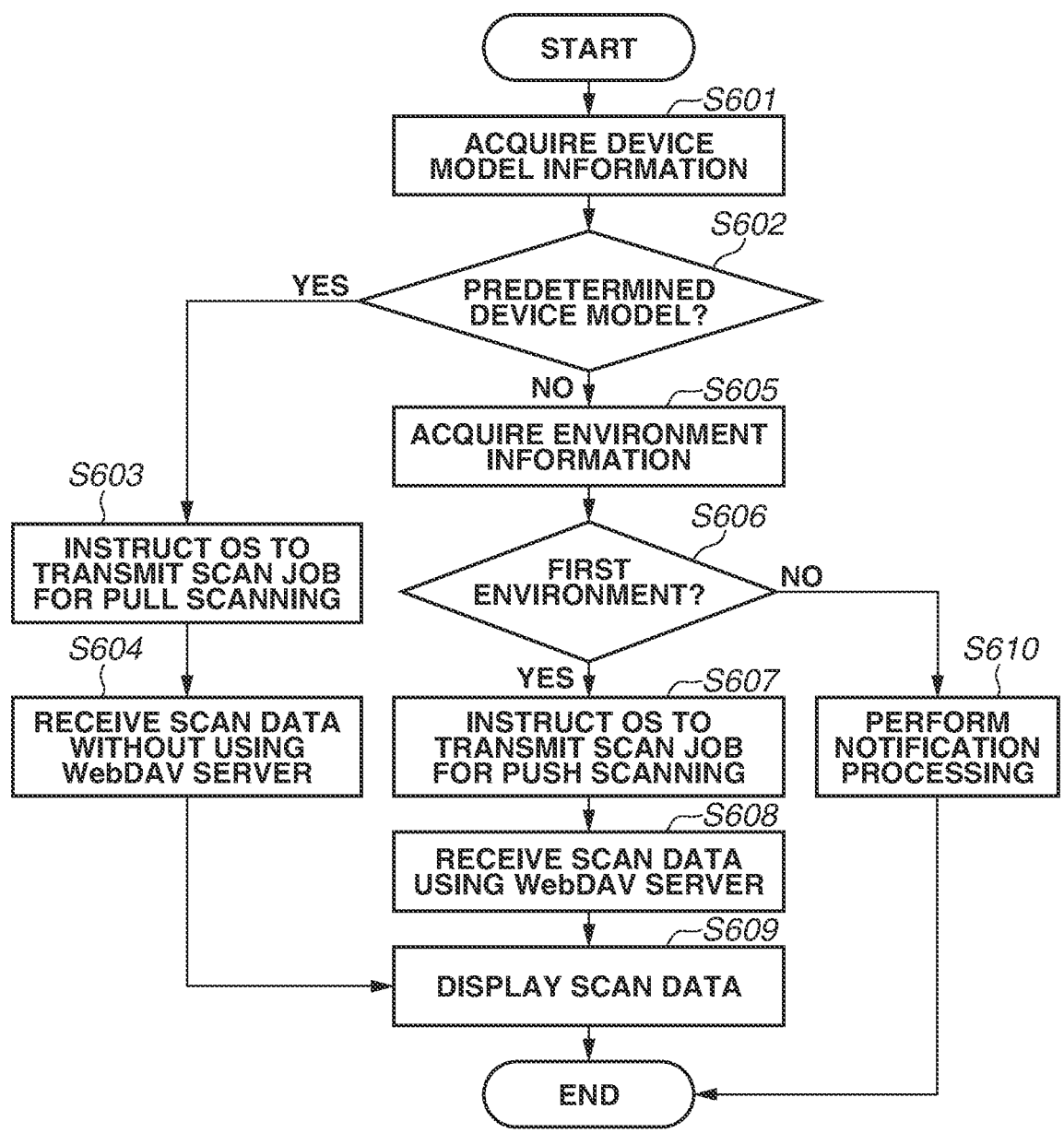
FIG. 6 is a flowchart illustrating a scanning function using the communication application.

FIG. 6 is a flowchart illustrating the scanning function by the communication application according to the present exemplary embodiment. The CPU 103 reads various programs stored in a memory such as the external storage device 106 to the RAM 105 and executes the read programs to thereby implement the flowchart. Specifically, the flowchart is implemented by executing the communication application. Further, the process is started in a case where an operation that triggers performance of the scanning function is performed by a user on a screen displayed by the communication application.

In step S601, the CPU 103 identifies an apparatus that is a scan job transmission destination and acquires device model information about the identified apparatus. Specifically, for example, the CPU 103 identifies the communication apparatus 151 registered in the communication application as a scan job transmission destination. In a case where a plurality of apparatuses is registered in the communication application, the CPU 103 can prompt a user to select one of the plurality of apparatuses registered in the communication application and can identify the selected apparatus as a scan job transmission destination. The selection by the user can be received in step S601 or can be received in advance before the operation that triggers performance of the scanning function is performed by the user. In a case where the communication apparatus 151 is identified, the CPU 103 refers to the capability information about the communication apparatus 151 that is managed to register the communication apparatus 151 in the communication application, thereby acquiring device model information included in the capability information.

In step S602, the CPU 103 determines whether the device model of the scan job transmission destination apparatus is a predetermined device model that supports pull scanning. The pull scanning is a form of scanning in which scan data is received from the communication apparatus 151 via a session established between the information processing apparatus 101 and the communication apparatus 151 by the information processing apparatus 101. According to the present exemplary embodiment, the predetermined device model corresponds to, for example, some of device models that support inkjet printers configured to perform printing using an inkjet method and device models that support electrophotographic printers configured to perform printing using an electrophotographic method. Further, some of the device models that support electrophotographic printers configured to perform printing using an electrophotographic method correspond to a device model that is different from the predetermined device model and support push scanning. In a case where the determination result is YES (YES in step S602), the processing proceeds to step S603, whereas in a case where the determination result is NO (NO in step S602), the processing proceeds to step S605.

In step S603, the CPU 103 instructs an underlying OS of the communication application to transmit a scan job from the communication application. Consequently, a scan job is transmitted from the information processing apparatus 101 to the communication apparatus 151. The underlying OS of the communication application is the Android OS in the first environment or the virtual Android OS in the second environment. In the second environment, the virtual Android OS instructs the Chrome OS to transmit the scan job. The scan job transmitted here is a job that causes the communication apparatus 151 to perform pull scanning and is generated by the communication application.

In step S604, the CPU 103 acquires, from the underlying OS of the communication application, scan data acquired from the communication apparatus 151 by the information processing apparatus 101 using the communication application without using the WebDAV server. Thereafter, the processing proceeds to step S609.

In step S605, which is performed in a case where the determination result in step S602 is NO, the CPU 103 acquires environment information. This process is similar to step S401.

In step S606, the CPU 103 determines whether the environment in which the communication application is running is the first environment, based on the environment information acquired in step S605. In a case where the determination result is YES (YES in step S606), the processing proceeds to step S607, whereas in a case where the determination result is NO (NO in step S606), the processing proceeds to step S610. As illustrated in FIG. 4, according to the present exemplary embodiment, different search processes are performed based on the environment in which the communication application is running. Thus, the environment in which the communication application is running is identified based on the search process by which the scan job transmission destination apparatus is discovered. Thus, the process of step S606 can be, for example, a process of identifying the search process by which the scan job transmission destination apparatus is discovered. Then, in a case where the identified search process is the search process that is performed in a case where the environment in which the communication application is running is the first environment, the processing can proceed to step S607. On the other hand, in a case where the identified search process is the search process that is performed in a case where the environment in which the communication application is running is the second environment, the processing can proceed to step S610.

In step S607, the CPU 103 instructs the Android OS to transmit a scan job from the communication application. Consequently, a scan job is transmitted from the information processing apparatus 101 to the communication apparatus 151. The scan job transmitted here is a job that causes the communication apparatus 151 to perform push scanning and is generated by the communication application. Thus, the CPU 103 activates the WebDAV server using the communication application.

In step S608, the CPU 103 acquires, from the Android OS using the WebDAV server, scan data acquired from the communication apparatus 151 by the information processing apparatus 101 using the communication application.

In step S609, the CPU 103 displays an image represented by the scan data acquired by the communication application. Thereafter, the process in the flowchart ends.

Figure 7:
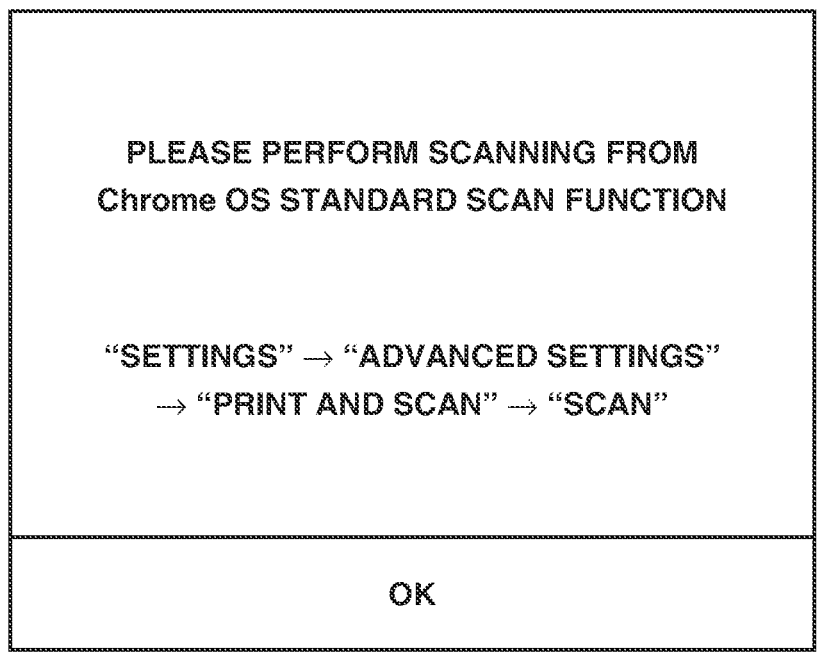
FIG. 7 is a diagram illustrating an example of a notification screen.

In step S610, which is performed in a case where the determination result in step S606 is NO, the CPU 103 performs a notification process of displaying a notification screen to provide a notification indicating that the scanning function cannot be performed from the communication application. FIG. 7 illustrates an example of the notification screen displayed here. The notification screen can be, for example, a screen that prompts a user to perform a standard scanning function installed in the host OS. Further, the notification screen can be a screen that presents an operation for performing the standard scanning function. The notification screen can be a screen that includes a button for displaying a web manual presenting an operation for performing the standard scanning function installed in the host OS using a web browser. The standard scanning function is performed by a standard scan application that is pre-installed together with the host OS in the information processing apparatus 101 and controls the standard scanning function. Thus, the screen that prompts a user to perform the standard scanning function can also be described as, for example, a screen that prompts the user to use the standard scan application. Further, the screen that presents the operation for performing the standard scanning function can also be described as, for example, a screen that presents an operation for activating the standard scan application. The notification screen can be, for example, a screen that prompts a user to select whether to activate the standard scan application. Then, in a case where an input to activate the standard scanning function is received, the CPU 103 can activate the standard scan application from the communication application. Since the standard scan application is an application for the host OS, the standard scan application operates without using the guest OS. Thus, the standard scan application can acquire, from the communication apparatus 151, scan data obtained by a scan performed based on the scan job transmitted based on an instruction from the standard scan application. Further, in step S610, the CPU 103 can perform an activation process to activate the standard scan application from the communication application without performing the notification process. Further, in step S610, the CPU 103 can determine whether a version of the host OS is a version that supports the activation process, and in a case where the determination result is YES, the CPU 103 can perform the activation process, whereas in a case where the determination result is NO, the CPU 103 can perform the notification process. As the activated standard scan application is operated by a user, a scan job is transmitted from the information processing apparatus 101 to the communication apparatus 151 based on an instruction from the standard scan application. The scan job transmitted based on an instruction from the standard scan application is a job generated by the standard scan application. Thus, the process of step S610 can also be described as a process for transmitting a scan job generated by the standard scan application different from the communication application. After step S610, the process in the flowchart ends.

As described above, according to the present exemplary embodiment, the transmission of a scan job to the communication apparatus 151 is not performed in a case where the environment in which the communication application is running is the second environment and the communication application cannot acquire scan data from the communication apparatus 151. Then, as a process that is not the process of transmitting a scan job, for example, the process or displaying the notification screen or the process of activating the standard scan application is performed. This makes it possible to provide an alternative method for acquiring scan data to the user in a situation where the communication application cannot acquire scan data from the communication apparatus 151.

The above-described issues that occur in the second environment may also occur in a case where the host OS in the second environment is an OS other than the Chrome OS or in a case where the guest OS in the second environment is an OS other than the Android OS. Specifically, while the second environment is the environment in which the virtual Android OS runs on the Chrome OS and the Android OS application runs on the virtual Android OS in the above-described form, this is not a limiting form. For example, the OS that runs on the lowest layer can be not the Chrome OS but another OS such as a Windows (registered trademark) OS provided by Microsoft Corporation or a Mac (registered trademark) OS provided by Apple Inc. Further, the guest OS and the application that runs on the guest OS can be not the Android OS and the Android OS application but an iOS (registered trademark) or an iOS application. Thus, for example, the CPU 103 can identify which OS the host OS is in the second environment using the communication application prior to step S610. Then, in the notification process in step S610, a notification screen with content corresponding to the identified OS can be displayed. Specifically, for example, in a case where the name of the standard scan application and the method for activating the standard scan application differ for each OS type, the name of the standard scan application that corresponds to the identified OS and the method of activating the standard scan application on the identified OS can be displayed on the notification screen. Further, for example, in step S610, instead of the notification process, the process of activating the standard scan application that corresponds to the identified OS can be performed.

As described above, the host OS in the second environment is not limited to the Chrome OS and can be another OS such as a Windows OS. Further, there may be a case where, for example, there is an application for another OS that is different from the communication application and is provided by the same vendor as the communication application. A form according to the present exemplary embodiment in which different processes are performed for different host OS types in the second environment will be described below.

Figure 8:
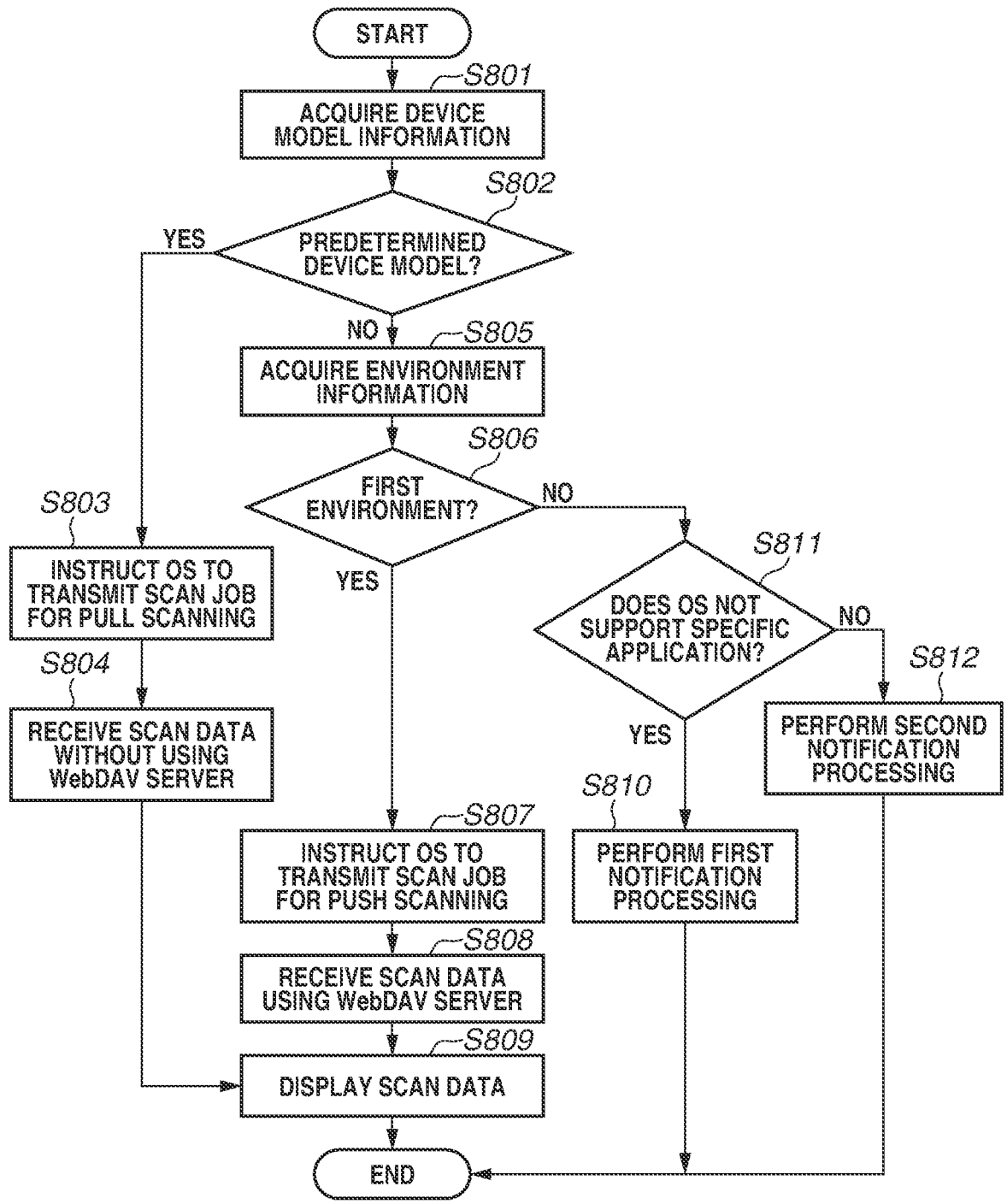
FIG. 8 is a flowchart illustrating a scanning function using the communication application.

FIG. 8 is a flowchart illustrating a scanning function by the communication application according to the present exemplary embodiment. The CPU 103 reads various programs stored in a memory such as the external storage device 106 to the RAM 105 and executes the read programs to thereby implement the flowchart. Specifically, the flowchart is implemented by executing the communication application. Further, the process is started in a case where an operation that triggers performance of the scanning function is performed by a user on a screen displayed by the communication application.

Steps S801 to S810 correspond to steps S601 to S610, so that redundant descriptions thereof are omitted.

In step S811, which is performed in a case where the determination result in step S806 is NO, the CPU 103 identifies the host OS in the second environment using the communication application. Then, the CPU 103 determines whether the identified host OS is an OS that does not support a specific scan application using the communication application. The specific scan application refers to an application that is different from the communication application and is provided by the same vendor as the communication application. According to the present exemplary embodiment, the Chrome OS is an OS that does not support the specific scan application. Further, the Windows OS is an OS that supports the specific scan application. Specifically, there is a scan application for the Windows OS as the specific scan application. The scan application for the Windows OS is operable without the guest OS also in the second environment and thus can acquire scan data acquired by push scanning performed by the communication apparatus 151. As described above, whether an OS is an OS that supports the specific scan application is determined based on the type of the OS, the determination process in step S811 can be a process of determining whether the host OS is a Chrome OS. In a case where the determination result is YES (YES in step S811), the processing proceeds to step S810, and a notification process corresponding to step S610 is performed as a first notification process. On the other hand, in a case where the determination result is NO (NO in step S811), the processing proceeds to step S812.

In step S812, the CPU 103 performs a second notification process. The second notification process is a process of displaying a notification screen that prompts a user to use a predetermined application. The notification screen displayed here can be, for example, a screen that displays a button for activating the predetermined application. In a case where the button is pressed and the predetermined application is pre-installed in the information processing apparatus 101, the CPU 103 activates the predetermined application. On the other hand, in a case where the button is pressed and the predetermined application is not installed in the information processing apparatus 101, the CPU 103 activates a store application for installing the predetermined application. The notification screen displayed here can be, for example, a screen that prompts a user to select whether to activate the predetermined application. Then, in a case where an input to activate the predetermined application is received, the CPU 103 can activate the predetermined application from the communication application. In step S812, the CPU 103 can activate the predetermined application without performing the notification process. Thereafter, the process ends.

With the foregoing form, a process suitable for the type of the host OS in the second environment is performed.

OTHER EXEMPLARY EMBODIMENTS

According to the above-described exemplary embodiments, the Chrome OS may be controlled by the firewall not to perform a broadcast search or a multicast search that is instructed by the Android OS application and uses the socket API. However, the firewall may not block the broadcast search or the multicast search depending on the content of the port number that is designated at the time of executing the socket API and is set in the packet for use in the search.

Thus, for example, the communication application can instruct the virtual Android OS to perform a broadcast search or a multicast search that is not blocked by the firewall using the socket API also in the second environment. Specifically, for example, there may be a case where a specific port number is set in a packet of a type that is configured so that only old-model inkjet printers can respond, and a broadcast search or a multicast search that uses the packet is not blocked by the firewall. In this case, for example, in step S411, the CPU 103 can instruct the virtual Android OS, from the communication application, to perform not only a search using the NSD API but also a broadcast search that uses the socket API and is performed by transmitting a type of a packet that is configured so that only old-model inkjet printers can respond. Then, in step S415, the CPU 103 can display not only the search result of step S414 but also a result of the broadcast search performed based on the instruction. At this time, apparatuses discovered by the NSD search and apparatuses discovered by the broadcast search are controlled not to be displayed redundantly. This makes it possible to discover, for example, an apparatus of a device model that cannot be discovered by an NSD search because the apparatus does not support IPP, also in the second environment.

Further, the flowchart in FIG. 4 can be started in a case where, for example, a network configuration is performed on the communication apparatus 151 from the information processing apparatus 101 using the communication application. Specifically, the network configuration is, for example, a process of transmitting information about the access point 131 to the communication apparatus 151 via a Wi-Fi or Bluetooth connection between the information processing apparatus 101 and the communication apparatus 151. Consequently, the communication apparatus 151 connects to the access point 131 using the information. Thereafter, in a case where the information processing apparatus 101 is also connected to the access point 131, the information processing apparatus 101 can discover the communication apparatus 151 by performing the flowchart in FIG. 4. Thus, in a case where the information processing apparatus 101 transmits the information about the access point 131 to the communication apparatus 151 via the Wi-Fi connection between the information processing apparatus 101 and the communication apparatus 151, the information processing apparatus 101 can disconnect the connection after transmitting the information and then establish a connection between the information processing apparatus 101 and the access point 131. Further, in a case where the flowchart is started based on performance of the network configuration, for example, the display of the search result screen can be skipped. Specifically, for example, instead of the process of displaying the search result screen to receive selection from a user, a process of identifying an apparatus which is discovered by the search and on which the network configuration is executed can be performed. Specifically, this identification process is performed by comparing a MAC address and a serial number that are acquired from the communication apparatus 151 via the connection used in the network configuration and are information about the communication apparatus 151 on which the network configuration is performed and a MAC address and a serial number that are acquired by the search and are information about the apparatus discovered by the search. Then, capability information can be acquired from the identified apparatus. Further, in a case where the flowchart is started based on performance of the network configuration, for example, the process relating to the WFD search (steps S405, S406, S408, and S409) can be skipped.

Further, in the above-described form, a unicast search target apparatus is determined from the apparatuses discovered by the NSD search in step S412 without user selection. This is not a limiting form, and a unicast search target apparatus can be determined from the apparatuses discovered by the NSD search based on user selection to perform only a unicast search for the determined apparatus. In this form, for example, the CPU 103 displays the search result screen using the communication application after the NSD search in step S412 is performed and before the unicast search is performed. The search result screen is a screen that presents a list of apparatuses discovered by the NSD search. Then, the CPU 103 determines, as a unicast search target, only the apparatus selected by a user from the apparatuses displayed on the search result screen. Then, the CPU 103 instructs the virtual Android OS to transmit a unicast search packet with an IP address of the determined apparatus designated therein using the communication application. Thereafter, the CPU 103 performs a process of registering an apparatus discovered by the unicast search in the communication application.

Further, in the above-described form, the unicast search is performed after the NSD search is performed in the second environment. This is not a limiting form, and in the second environment, for example, the unicast search can be performed without performing the NSD search. In this form, for example, in a case where the determination result in step S402 is NO, the CPU 103 does not perform steps S411 and S412.

Then, the CPU 103 displays a screen for receiving an input of an IP address from a user using the communication application. Then, in step S413, the CPU 103 performs a process for performing a unicast search to search for one or more apparatuses corresponding to the IP address input by a user via the screen. Specifically, the CPU 103 sets, in the unicast search packet, the IP address input by the user via the screen. Then, the CPU 103 executes the socket API to instruct the virtual Android OS to transmit the packet with the set IP address input by the user via the screen using the communication application.

Further, in the second environment, whether the NSD search has failed can be determined after the process for the NSD search is performed using the communication application. This determination is performed based on, for example, whether the communication application has been notified that the NSD search has failed. Then, in a case where it is determined that the NSD search has failed, the CPU 103 can display a screen for receiving an input of an IP address from a user using the communication application. Then, the CPU 103 can perform the unicast search process to search for one or more apparatuses corresponding to an IP address input by a user via the screen. This makes it possible to perform a unicast search even in a case where the NSD search fails and an IP address necessary for a unicast search is not acquired through the NSD search.

Further, while both a broadcast search and a WFD search are performed in a case where the determination result is YES in step S402 in the above-described form, this is not a limiting form. Only one of a broadcast search and a WFD search can be performed in a case where the determination result is YES in step S402. Specifically, for example, in the form in which only a broadcast search is performed in a case where the determination result is YES in step S402, steps S405, S406, S408, and S409 in the flowchart in FIG. 4 are skipped. Further, specifically, for example, in the form in which only a WFD search is performed in a case where the determination result is YES in step S402, steps S403, S404, and S408 in the flowchart in FIG. 4 are skipped, and step S409 is performed always after step S407. Further, while the process in the flowchart in FIG. 4 is performed as a process of searching for a communication apparatus and the process in the flowchart in FIG. 6 or 8 is performed as a scanning process in the above-described form, this is not a limiting form. For example, a form in which the process in the flowchart in FIG. 4 is performed as a process of searching for a communication apparatus and a publicly-known process different from the processes in the flowcharts in FIGS. 6 and 8 is performed as a scanning process can be employed. Alternatively, for example, a form in which the process in the flowchart in FIG. 4 is performed as a process of searching for a communication apparatus and the communication application is without the scanning function and does not perform a scanning process can be employed. Alternatively, for example, a form in which a publicly-known process different from the process in the flowchart in FIG. 4 is performed as a process of searching for a communication apparatus and the process in the flowchart in FIG. 6 or 8 is performed as a scanning process can be employed.

While the NSD API is executed in step S411 in the process in the flowchart in FIG. 4 in the above-described form, this is not a limiting form. For example, the NSD API can be executed at a timing before the flowchart in FIG. 4, such as the timing of activating the communication application. In this form, for example, the determination corresponding to step S402 is performed at a timing before the flowchart in FIG. 4.

Then, in a case where it is determined that the environment is the first environment, no search process is performed at this timing, whereas in a case where it is determined that the environment is not the first environment, the NSD API is executed, which corresponds to step S411. Then, step S411 in the flowchart in FIG. 4 is skipped. In this form, the NSD result can be acquired before the flowchart in FIG. 4. The NSD by the host OS can be performed continuously, and each time the NSD result changes, the communication application can acquire the NSD result. Then, in step S412, a new NSD result can be acquired, or a previously-acquired NSD result can be referred to.

It is apparent that embodiments of the present disclosure can be implemented also by supplying, to a system or an apparatus, a recording medium that records program codes of software for implementing the functions according to the above-described exemplary embodiments and causing a computer (or a CPU or a micro-processing unit (MPU)) of the system or the apparatus to read the program codes stored in the recording medium and execute the read program codes. In this case, the program codes read from the storage medium implement the functions according to the above-described exemplary embodiments, and the storage medium storing the program codes constitutes the present disclosure.

Examples of storage media that can be used to supply the program codes include flexible disks, hard disks, optical disks, magneto-optical disks, compact disk (CD) ROMs (CD-ROMs), CD recordable (CD-Rs), magnetic tapes, non-volatile memory cards, ROMs, and digital versatile disks (DVDs).

Furthermore, it is apparent that not only the cases where the functions according to the above-described exemplary embodiments are implemented by executing the program codes read by the computer but also the cases where the functions according to the above-described exemplary embodiments are implemented by processes performed partially or entirely by an OS running on the computer based on instructions of the program codes are encompassed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-189867, filed Nov. 29, 2022, which is hereby incorporated by reference herein in its entirety.

What is claimed is:

1. A control method for controlling a second information processing apparatus including a predetermined program that is configured to run on an operating system (OS) and causes a computer of a first information processing apparatus having a first operation environment being on a first OS running as a host OS but not being on a guest OS to perform, based on the predetermined program being running in the first operation environment, a predetermined process of transmitting a scan job generated by the predetermined program to a communication apparatus, and having a second operation environment being on a second OS running as the host OS and being on the guest OS, the control method comprising:
performing, based on the predetermined program being running in the second operation environment, control so that the predetermined process is not performed; and
performing, based on the predetermined program being running in the second operation environment, a process relating to another program that is different from the predetermined program and controls a standard scan function pre-installed in the host OS.

2. The control method according to claim 1,
wherein in a case where the communication apparatus is an apparatus of a predetermined model, the predetermined process is performed using the predetermined program regardless of whether the predetermined program is running in the first operation environment or the second operation environment, and
wherein in a case where the communication apparatus is not the apparatus of the predetermined model, whether to perform the predetermined process using the predetermined program is controlled based on whether the predetermined program is running in the first operation environment or the second operation environment.

3. The control method according to claim 2, wherein the apparatus of the predetermined model is of a model that supports pull scanning, and an apparatus that is not the apparatus of the predetermined model is of a model that supports push scanning.

4. The control method according to claim 2, wherein the apparatus of the predetermined model is of a model that supports a process of transmitting scan data to the information processing apparatus without using a web-based distributed authoring and versioning (WebDAV) server, and an apparatus that is not the apparatus of the predetermined model is of a model that supports a process of transmitting the scan data to the information processing apparatus via the WebDAV server.

5. The control method according to claim 1, wherein the process relating to the other program is at least one of a process of prompting a user to use the other program, a process of presenting an operation of activating the other program, a process of prompting the user to select whether to activate the other program, and a process of activating the other program.

6. The control method according to claim 1,
wherein in a case where the predetermined program is running in the second operation environment and the host OS is an OS of a first type, the process relating to the other program for the OS of the first type is performed, and
wherein in a case where the predetermined program is running in the second operation environment and the host OS is an OS of a second type different from the first type, the process relating to the other program for the OS of the second type is performed.

7. The control method according to claim 1,
wherein in a case where the predetermined program is running in the second operation environment and the host OS is an OS of a first type, the process relating to the other program is performed, and
wherein in a case where the predetermined program is running in the second operation environment and the host OS is an OS of a second type different from the first type, a process relating to a specific program that is different from the predetermined program and is provided by the same vendor as the predetermined program is performed.

8. The control method according to claim 7, wherein the process relating to the specific program is at least one of a process of prompting a user to use the specific program, a process of prompting the user to select whether to activate the specific program, a process of installing the specific program in the information processing apparatus, and a process of activating the specific program.

9. The control method according to claim 1, wherein the scan job is a job of transmitting scan data to the information processing apparatus via a WebDAV server.

10. The control method according to claim 1, further comprising displaying scan data using the predetermined program.

11. The control method according to claim 1, further comprising identifying the communication apparatus that is a transmission destination of the scan job from one or more communication apparatuses registered in the predetermined program.

12. The control method according to claim 11, further comprising:
performing third execution so that a first process of searching for an apparatus on a network to which the information processing apparatus belongs is performed using the predetermined program in a case where the predetermined program is running in the second operation environment; and
registering, in the predetermined program, at least one apparatus discovered through the search performed by the information processing apparatus.

13. The control method according to claim 12, wherein the first process is a process of instructing the guest OS to perform the search using a network service discovery application programming interface (API).

14. The control method according to claim 1, further comprising performing a process of transmitting a print job to include printing.

15. The control method according to claim 1,
wherein in the first operation environment, the first OS being the host OS is an Android (registered trademark) OS, and the guest OS is not running on the host OS, and
wherein in the second operation environment, the second OS being the host OS is a Chrome (registered trademark) OS, and the guest OS is a virtual Android (registered trademark) OS.

16. The control method according to claim 1, wherein the predetermined program is an Android (registered trademark) OS application program.

17. The control method according to claim 1, further comprising performing a determination process of determining whether the predetermined program is running in the first operation environment or the second operation environment,
wherein based on being determined that the predetermined program is running in the second operation environment, the predetermined process is controlled not to be performed, and
wherein based on being determined that the predetermined program is running in the second operation environment, the process relating to the other program is performed.

18. A non-transitory computer-readable storage medium that stores a predetermined program that is configured to run on an OS and causes a computer of a first information processing apparatus having a first operation environment being on a first OS running as a host OS but not being on a guest OS to perform, based on the predetermined program being running in the first operation environment, a predetermined process of transmitting a scan job generated by the predetermined program to a communication apparatus, the predetermined program causing a computer of a second information processing apparatus having a second operation environment being on a second OS running as the host OS and being on the guest OS to perform:
based on the predetermined program being running in the second operation environment, control so that the predetermined process is not performed; and
based on the predetermined program being running in the second operation environment, a process relating to another program that is different from the predetermined program and controls a standard scan function pre-installed in the host OS.

19. A second information processing apparatus including a predetermined program that is configured to run on an OS and causes a computer of a first information processing apparatus having a first operation environment being on a first OS running as a host OS but not being on a guest OS to perform, based on the predetermined program being running in the first operation environment, a predetermined process of transmitting a scan job generated by the predetermined program to a communication apparatus, and having a second operation environment being on a second OS running as the host OS and being on the guest OS, the second information processing apparatus comprising:
one or more processors; and
one or more memories storing one or more programs including the predetermined program, wherein the one or more memories and the one or more processors are configured to cause the second information processing apparatus to:
perform, based on the predetermined program being running in the second operation environment, control so that the predetermined process is not performed; and
perform, based on the predetermined program being running in the second operation environment, a process relating to another program that is different from the predetermined program and controls a standard scan function pre-installed in the host OS.

* * * * *